United States Patent
Fakiri et al.

(10) Patent No.: US 12,275,107 B2
(45) Date of Patent: Apr. 15, 2025

(54) SYSTEMS AND METHODS OF DEFECT REPAIR OF METAL PIPELINES USING COMPOSITE WRAP REPAIR WITH DIODE LASER CURING

(71) Applicant: Saudi Arabian Oil Company, Dhahran (SA)

(72) Inventors: Abderrahim Fakiri, Dhahran (SA); Layan Alaeddin AlSharif, Dhahran (SA); Mazyad Alyami, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 154 days.

(21) Appl. No.: 17/974,071

(22) Filed: Oct. 26, 2022

(65) Prior Publication Data
US 2024/0139891 A1   May 2, 2024

(51) Int. Cl.
*B29C 73/02* (2006.01)
*B23P 6/04* (2006.01)
*F16L 55/168* (2006.01)

(52) U.S. Cl.
CPC .............. *B23P 6/04* (2013.01); *F16L 55/1683* (2013.01)

(58) Field of Classification Search
CPC . B29C 2035/0838; B29C 73/02; B29C 73/10; F16L 55/1683; B23P 6/04
USPC ...................................................... 264/36.16
See application file for complete search history.

(56) References Cited

U.S. PATENT DOCUMENTS

| | | | |
|---|---|---|---|
| 7,938,146 B2 | 5/2011 | Brooks et al. | |
| 9,016,324 B2 | 4/2015 | Niccolls et al. | |
| 9,970,411 B2 | 5/2018 | Fang et al. | |
| 2011/0139351 A1 | 6/2011 | Morton | |
| 2014/0048164 A1* | 2/2014 | Souza | F16L 58/1054 138/172 |
| 2014/0077420 A1 | 3/2014 | Fang et al. | |
| 2015/0273761 A1* | 10/2015 | Safai | B23K 26/082 156/359 |

FOREIGN PATENT DOCUMENTS

| | | | |
|---|---|---|---|
| KR | 101383855 | 4/2014 | |
| KR | 102186483 | 12/2020 | |
| WO | WO-2018061026 A1 * | 4/2018 | ............. B29C 63/06 |

OTHER PUBLICATIONS

Chern et al., "Thermal analysis of in-situ curing for thermoset, hoop-wound structures using infrared heating: Part I—predictions assuming independent scattering," Transactions of the ASME, Aug. 1995, 117:674-680, 7 pages.

Gao et al., "Luteolin-based epoxy resin with exceptional heat resistance, mechanical and flame retardant properties," Chemical Engineering Journal, Jan. 2022, 428:131173, 12 pages.

Gopal et al., "Optimal temperature profiles for minimum residual stress in the cure process of polymer composites," Composite Structures, Jan. 2000, 48:99-106, 8 pages.

(Continued)

*Primary Examiner* — Jeffrey M Wollschlager
*Assistant Examiner* — Xue H Liu
(74) *Attorney, Agent, or Firm* — Fish & Richardson P.C.

(57) ABSTRACT

Provided are systems and methods for repairing defects in metal pipes using a composite wrap repair system with diode laser curing.

20 Claims, 2 Drawing Sheets

(56) References Cited

OTHER PUBLICATIONS

Heatxperts.com [online], "Heating Blanket," Oct. 2020, [retrieved on Aug. 9, 2022], retrieved from URL <https://www.heatxperts.com/en/heating-blanket-1300x1300-mm>, 6 pages.

Kinsey et al., "A thermal model for cure of thermoset composites," Journal of Materials Processing Technology, Jan. 1997, 63:442-449, 8 pages.

Konuray et al., "Latent curing of epoxy-thiol thermosets," Polymer, May 2017, 116:191-203, 13 pages.

Korotkov et al., "The simultaneous process of filament winding and curing for polymer composites," Composites Science and Technology, Jan. 1993, 47:383-388, 6 pages.

Lambiase et al., "Laser-assisted direct-joining of carbon fibre reinforced plastic with thermosetting matrix to polycarbonate sheets," Optics & Laser Technology, Sep. 2017, 94:45-58, 14 pages.

Lim et al., "An overview of corroded pipe repair techniques using composite materials," International Journal of Materials and Metallurgical Engineering, Nov. 2015, 10:19-25, 7 pages.

Neĭman et al., "The thermal degradation of some epoxy resins," Journal of Polymer Science, Feb. 1962, 56:383-389, 7 pages.

Pethrick, "Composite to metal bonding in aerospace and other applications," Welding and Joining of Aerospace Materials, Woodhead Publishing, Jan. 2012, 288-319, 32 pages.

Simone, "An experimental investigation on the laser cure of thermosetting powder: An empirical model for the local coating," Progress in Organic Coatings, Aug. 2010, 68:340-346, 7 pages.

Wagner et al., "On-line consolidation of thermoplastic towpreg composites in filament winding," Polymer Composites, Dec. 1994, 15:436-441, 6 pages.

Wang et al., "Simple thermal model for online laser curing of thermoset composites in filament winding," International Journal of Energy Research, Mar. 2003, 27:377-388, 12 pages.

Zaami et al., "New process optimization framework for laser assisted tape winding of composite pressure vessels: Controlling the unsteady bonding temperature," Materials & Design, Nov. 2020, 196:109130, 13 pages.

\* cited by examiner

SYSTEMS AND METHODS OF DEFECT REPAIR OF METAL PIPELINES USING COMPOSITE WRAP REPAIR WITH DIODE LASER CURING

TECHNICAL FIELD

The disclosure describes systems and methods of composite wrap repairs of metal pipeline defects that include curing using a diode laser.

BACKGROUND

Composite wraps are a method of repairing non-leaking defects, for example corrosion, dents, pits and cracks, in metal pipelines. Composite repair systems typically include a high strength composite wrap, a compressive infill material, and an interlayer adhesive.

A composite repair composite can contain multiple layers of carbon, glass, or aramid fibers bound together by a polymeric matrix containing epoxy, polyurethane, or vinylester in the form of a patch or wrap. First, the surrounding pipeline surfaces are prepared to receive the composite wrap and filler by grit blasting, or an equivalent process. Putty filler is used to fill any voids in the pipeline created by the defect and to taper uneven welds or misaligned pipes. The surface is then prepared with a low viscosity polymeric primer to ensure bonding and load transfer between the repair and the substrate. The structural reinforcing fibers, or fabrics, are then saturated with a liquid polymer and the wet fibers are wrapped around the outer pipeline surface. The wrap is allowed to cure at ambient temperature and atmospheric pressure.

A thermal curing process is used to crosslink the interlayer adhesive resin. The curing process determines the mechanical, thermal, and chemical properties of the resin and fiber. Generally, composite wrap systems are cured by external heating tools such as heated sleeves or blankets or at ambient temperature, which requires several hours of curing, resulting in high processing times and costs.

Proper selection of a curing cycle is important to yield fully cured materials with good performance.

Cure temperatures that are too high can induce thermal residual stresses, whereas cure temperatures that are too low may not fully cure the adhesive. Furthermore, the cool down rate post-curing will affect the amount of residual stress. Thermal models have shown that an adaptive cure cycle can minimize thermally induced residual strain and that heating ramps that are too steep will cause extreme overheating due to rapid release of chemical bonds during the process.

SUMMARY

Provided in the present disclosure is a method of repairing a defect section in a metal pipe. In some embodiments, the method of repairing a defect section in a metal pipe includes a) applying a layer of a composite wrap on the defect section; b) disposing a layer of wet-out resin on the composite wrap; and c) at least partially curing the layer of wet-out resin with a diode laser.

In some embodiments, a temperature generated by the diode laser is about 50° C. to about 450° C.

In some embodiments, the wavelength of the diode laser is about the same wavelength as an absorption maximum of the wet-out resin. In some embodiments, the diode laser has a wavelength of about 600 nm to about 4000 nm.

In some embodiments, the diode laser has a power of about 200 W to about 1000 W.

In some embodiments, the diode laser has a scan speed of about 1000 mm/min to about 5000 mm/min.

In some embodiments, steps a) to c) are repeated until 1 to 50 layers of wet-out resin are disposed.

In some embodiments, after the layers of wet-out resin are disposed, the layers of wet-out resin are fully cured using the diode laser at a second intensity.

In some embodiments, a temperature generated by the diode laser at the second intensity is about 100° C. to about 250° C.

In some embodiments, at the second intensity, the diode laser has a power of about 200 W to about 600 W.

In some embodiments, the method of repairing a defect section in a metal pipe further includes, prior to applying the layer of a composite wrap, leveling the defect section by disposing a filler material, and disposing an adhesive primer onto the defect section.

In some embodiments, the diode laser at least partially cures the adhesive primer.

In some embodiments, the method of repairing a defect section in a metal pipe further includes, prior to leveling the defect section by disposing the filler material, removing contaminants from a surface of the metal pipe.

In some embodiments, the composite wrap includes a non-metal fabric material. In some embodiments, the composite wrap includes carbon fibers, glass fibers, and/or aramid fibers. In some embodiments, the composite wrap includes woven fiberglass.

In some embodiments, the wet-out resin includes an epoxy, a polyurethane and/or a vinyl ester.

In some embodiments, the adhesive primer includes an epoxy, a polyurethane and/or a vinyl ester.

In some embodiments, the metal pipe is a pipeline used to transport a hydrocarbon, water, oil, gas, and/or liquid nitrogen.

Also provided in the present disclosure is a metal pipe defect repair system. In some embodiments, the metal pipe defect repair system includes a metal pipe with a defect section, at least one layer of a composite wrap disposed on the defect section, a layer of wet-out resin disposed on each layer of the composite wrap, and a diode laser configured to cure the layer of wet-out resin.

DETAILED DESCRIPTION

Figure 1:
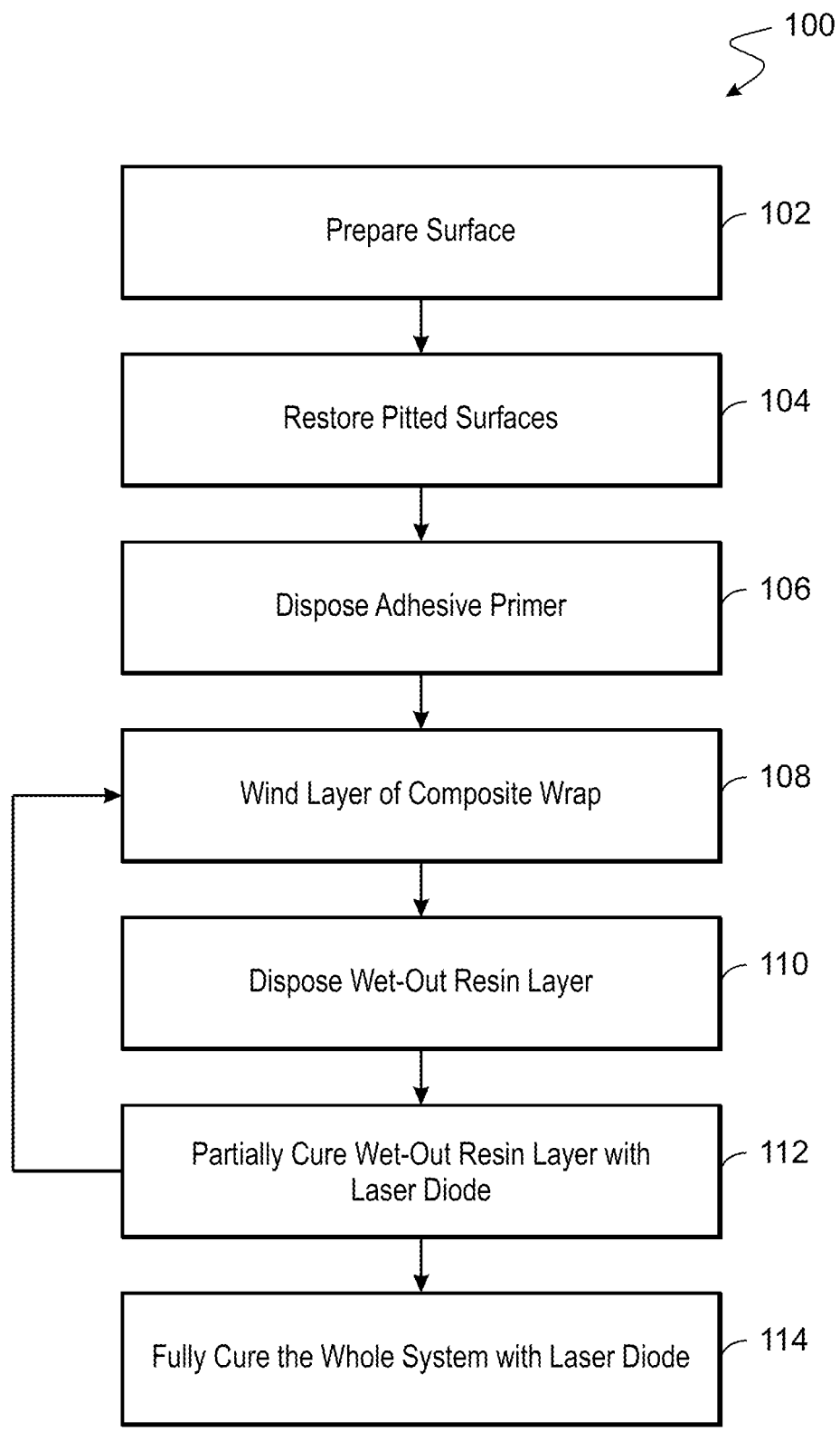
FIG. 1 shows a flowchart for a composite wrap repair method with a laser curing.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Composite wrap repair systems and methods can be used to repair defects in metal pipelines, such as pipelines configured to transport oil. A continuous, high-powered, diode laser can be used as the heat source in the curing steps of the composite wrap repair systems and methods. Using a diode laser can enable fast and uniform curing of the composite system relative to other curing methods. Additionally, diode lasers can provide higher temperatures with the same input power relative to other heat sources used in a curing method.

Provided in the present disclosure are systems and methods of repairing a defect in a metal pipe. The systems and methods include applying a layer of a composite wrap on the defect section being repaired, disposing a layer of a wet-out resin on the composite wrap, and at least partially curing the layer of wet-out resin with a diode laser. The steps can be repeated to apply a desired number of layers of wet-out resin. The layers of wet-out resin can be fully cured using the diode laser. Prior to applying the composite wrap on the adhesive primer, an adhesive primer can be disposed. The adhesive primer can be at least partially cured by the diode laser.

Definitions

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

As used in the disclosure, the term "partially curing" refers to a process where a first portion of the monomers and/or crosslinkers have reacted but a second portion different from the first portion have not reacted and are still capable of reacting.

Systems and Methods of Composite Wrap Repair of Metal Pipes with Diode Laser Curing Provided in the present disclosure are systems and methods for repairing defects in metal pipes using a composite wrap repair system with diode laser curing. The systems and methods include applying a layer of a composite wrap on the defect section being repaired, disposing a layer of a wet-out resin on the composite wrap, and at least partially curing the layer of wet-out resin with a diode laser. The systems and methods include laser curing of thermosets, such as laser curing of thermosets for pipeline repair.

Methods of Composite Wrap Repair with Diode Laser Curing

FIG. 1 depicts a flow chart 100 for a composite wrap repair method with diode laser curing, to repair defects in a metal pipe. In step 102, the surface of the metal pipe is prepared by removing contaminants to provide a surface that is dry and free of grease. Examples of contaminants include, but are not limited to, paint, rust, grease, and grime. Step 102 can be performed using any suitable method. In some embodiments, the surface of the metal is prepared by using abrasive blasting or sandpaper. In step 104, the pitted surfaces are restored by applying a high compressive-strength, load transferring filler material. Examples of such materials include, but are not limited to, cementitious grout, polyester, vinyl ester, polyurethane, thermoplastic material, rubber compound, acrylic, or any other suitable polymer filler that bonds to the metal and adds structural integrity to the metal pipe, to fill and level defects. In step 106, an adhesive primer is disposed. The adhesive primer can contain an epoxy resin that cures to a semi-rigid state. In some embodiments, a tool, such as a slotted hand towel or a paintbrush is used to dispose the adhesive primer. In step 108, the composite wrap is wound around the metal pipe. In step 110, a layer of wet-out resin is disposed on top of the composite wrap. In step 112, the wet-out resin layer is partially cured using a diode laser. The diode laser provides distributed heat over the entire repaired zone for primer adhesive and wet-out resin curing. In some embodiments, steps 108 to 112 are repeated until a desired number of layers of composite wrap have been disposed. In step 114, the whole system is fully cured using the diode laser at a lower temperature. Without wishing to be bound by any particular theory, it is believed that fully curing the whole system in step 114 with a lower temperature relieves residual stress.

Generally, the composite wrap is a webbing of non-metal composites. In some embodiments, the composite wrap is a woven fiberglass, or any other suitable fabric material, such as carbon, glass, or aramid fibers. In some embodiments, the composite wrap is pre-impregnated with a resin composition.

The primer adhesive and wet-out resin can be epoxy, vinyl ester, or another suitable polymer that bonds to the composite wrap and repaired section. In some embodiments, the primer adhesive and wet-out resin adds to the structural integrity of the system. Examples of resins include Polyester Resin, Vinyl Ester Resin, Epoxy, Phenolic and Urethane. Different materials have different curing processes, and the appropriate temperature and time for curing should be used to achieve appropriate bonding strength.

In some embodiments, the adhesive's optical and thermal properties dictate the choice of laser source. Adhesive resins have a wavelength of maximum absorptivity, and for most polymers, this wavelength is in the infrared. Therefore, in some embodiments, infrared lasers are suitable for adhesive curing. Different adhesives have different wavelengths for maximum absorptivity. For example, the characteristic absorption peak of the bisphenol A diglycidyl ether (DGEBA) epoxy groups occurs at 910 cm$^{-1}$. As another example, the absorbance peak for epoxy is 915 cm$^{-1}$.

Adhesive resins can withstand up to a certain temperature, after which they begin to deform. Generally, the thermal degradation of epoxy resins is in the temperature range of about 300° C.-450° C. Thus, the laser should provide heat at a wavelength that maximizes the resin's absorptivity and provides a temperature above the resin's glass transition temperature and below the resin's degradation temperature.

In some embodiments, the wavelength of the diode laser is about the same wavelength as an absorption maximum of the wet-out resin. In some embodiments, the diode laser has a wavelength of about 600 nm to about 4000 nm, such as about 600 nm to about 1000 nm, about 600 nm to about 1500 nm, about 600 nm to about 2000 nm, about 600 nm to about 2500 nm, about 600 nm to about 3000 nm, about 600 nm to about 3500 nm, about 1000 nm to about 1500 nm, about 1000 nm to about 2000 nm, about 1000 nm to about 2500 nm, about 1000 nm to about 3000 nm, about 1000 nm to about 3500 nm, about 1000 nm to about 4000 nm, about 1500 nm to about 2000 nm, about 1500 nm to about 2500 nm, about 1500 nm to about 3000 nm, about 1500 nm to about 3500 nm, about 1500 nm to about 4000 nm, about 2000 nm to about 2500 nm, about 2000 nm to about 3000 nm, about 2000 nm to about 3500 nm, about 2000 nm to about 4000 nm, about 2500 nm to about 3000 nm, about 2500 nm to about 3500 nm, about 2500 nm to about 4000 nm, about 3000 nm to about 3500 nm, about 3000 nm to about 4000, about 3500 nm to about 4000 nm, about 600 nm, about 700 nm, about 800 nm, about 900, nm, about 1000 nm, about 1100 nm, about 1200 nm, about 1300 nm, about 1400 nm, about 1500 nm, about 1600 nm, about 1700 nm, about 1800 nm, about 1900 nm, about 2000 about 2100 nm, about 2200 nm, about 2300 nm, about 2400 nm, about 2500 nm, about 2600 nm, about 2700 nm, about 2800 nm, about 2900 nm, about 3000 nm, about 3100 nm, about 3200 nm, about 3300 nm, about 3400 nm, about 3500 nm, about 3600 nm, about 3700 nm, about 3800 nm, about 3900 nm, or about 4000 nm.

In some embodiments, in the step 112, the diode laser has a power of about 200 W to about 1000 W, such as about 200 W to about 300 W, about 200 W to about 400 W, about 200 W to about 500 W, about 200 W to about 600 W, about 200 W to about 700 W, about 200 W to about 800 W, about 200 W to about 900 W, about 300 W to about 400 W, about 300 W to about 500 W, about 300 W to about 600 W, about 300 W to about 700 W, about 300 W to about 800 W, about 300 W to about 900 W, about 300 W to about 1000 W, about 400 W to about 500 W, about 400 W to about 600 W, about 400 W to about 700 W, about 400 W to about 800 W, about 400 W to about 900 W, about 400 W to about 1000 W, about 500 W to about 600 W, about 500 W to about 700 W, about 500 W to about 800 W, about 500 W to about 900 W, about 500 W to about 1000 W, about 600 W to about 700 W, about 600 W to about 800 W, about 600 W to about 900 W, about 600 W to about 1000 W, about 700 W to about 800 W, about 700 W to about 900 W, about 700 W to about 1000 W, about 800 W, about 800 W to about 1000 W, about 900 W to about 1000 W, about 200 W, about 300 W, about 400 W, about 500 W, about 600 W, about 700 W, about 800 W, about 900 W, or about 1000 W.

In some embodiments, the, the diode laser has a wavelength of about 900 nm to about 3000 nm and a power of about 200 W to 500 W, such as a wavelength of about 900 nm to about 1000 nm, about 900 nm to about 1500 nm, about 900 nm to about 2000 nm, about 900 nm to about 2500 nm, about 1000 nm to about 1500 nm, about 1000 nm to about 2000 nm, about 1000 nm to about 2500 nm, about 1000 nm to about 3000 nm, about 1500 nm to about 2000 nm, about 1500 nm to about 2500 nm, about 1500 nm to about 3000 nm, about 2000 nm to about 2500 nm, about 2000 nm to about 3000 nm, about 2500 nm to about 3000 nm, about 900 nm, about 1000 nm, about 1500 nm, about 2000 nm, about 2500 nm, or about 3000 nm and a power of about 200 W to about 250 W, about 200 W to about 300 W, about 200 W to about 350 W, about 200 W to about 400 W, about 200 W to about 450 W, about 250 W to about 300 W, about 250 W to about 350 W, about 250 W to about 400 W, about 250 W to about 450 W, about 250 W to about 500 W, about 300 W to about 350 W, about 300 W to about 400 W, about 300 W to about 450 W, about 300 W to about 500 W, about 350 W to about 400 W, about 350 W to about 450 W, about 350 W to about 500 W, about 400 W to about 450 W, about 400 W to about 500 W, about 450 W to about 500 W, about 200 W, about 250 W, about 300 W, about 350 W, about 400 W, about 450 W, or about 500 W.

In some embodiments, in the step 112, the temperature generated by the diode laser is about 50° C. to about 450° C., such as about 50° C. to about 100° C., about 50° C. to about 150° C., about 50° C. to about 200° C., about 50° C. to about 250° C., about 50° C. to about 300° C., about 50° C. to about 350° C., about 50° C. to about 400° C., about 100° C. to about 150° C., about 100° C. to about 200° C., about 100° C. to about 250° C., about 100° C. to about 300° C., about 100° C. to about 350° C., about 100° C. to about 400° C., about 100° C. to about 450° C., about 150° C. to about 200° C., about 150° C. to about 250° C., about 150° C. to about 300° C., about 150° C. to about 350° C., about 150° C. to about 400° C., about 150° C. to about 450° C., about 200° C. to about 250° C., about 200° C. to about 300° C., about 200° C. to about 350° C., about 200° C. to about 400° C., about 200° C. to about 450° C., about 250° C. to about 300° C., about 250° C. to about 350° C., about 250° C. to about 400° C., about 250° C. to about 450° C., about 300° C. to about 350° C., about 300° C. to about 400° C., about 300° C. to about 450° C., about 350° C. to about 400° C., about 350° C. to about 450° C., about 400° C. to about 450° C., about 50° C., about 100° C., about 150° C., about 200° C., about 250° C., about 300° C., about 350° C., about 400° C., or about 450° C.

In some embodiments, in the step 114, the diode laser has a power of about 200 W to about 600 W, such as about 200 W to about 250 W, about 200 W to about 300 W, about 200 W to about 350 W, about 200 W to about 400 W, about 200 W to about 450 W, about 200 W to about 500 W, about 200 W to about 550 W, about 250 W to about 300 W, about 250 W to about 350 W, about 250 W to about 400 W, about 250 W to about 450 W, about 250 W to about 500 W, about 250 W to about 600 W, about 300 W to about 350 W, about 300 W to about 400 W, about 300 W to about 450 W, about 300 W to about 500 W, about 300 W to about 550 W, about 300 W to about 600 W, about 350 W to about 400 W, about 350 W to about 450 W, about 350 W to about 500 W, about 350 W to about 550 W, about 350 W to about 600 W, about 400 W to about 450 W, about 400 W to about 500 W, about 400 W to about 550 W, about 400 W to about 600 W, about 450

W to about 500 W, about 450 W to about 550 W, about 450 W to about 600 W, about 500 W to about 550 W, about 500 W to about 600 W, about 550 W to about 600 W, about 200 W, about 250 W, about 300 W, about 350 W, about 400 W, about 450 W, about 500 W, about 550 W, or about 600 W.

In some embodiments, in the step 114, the temperature generated by the diode laser is about 100° C. to about 250° C., such as about 100° C. to about 150° C., about 100° C. to about 200° C., about 100° C. to about 250° C., about 150° C. to about 200° C., about 150° C. to about 250° C., about 200° C. to about 250° C., about 100° C., about 150° C., about 200° C., or about 250° C.

The absorption depths of laser in thermoset resins is in the range of nanometers to a few micrometers. Without wishing to be bound by any particular theory, complete absorption of laser within thermoset resins is only assumed at the surface, limiting the use of laser for curing substrates with defined thicknesses.

Composite Wrap Repair Systems with Diode Laser Curing

Figure 2A:
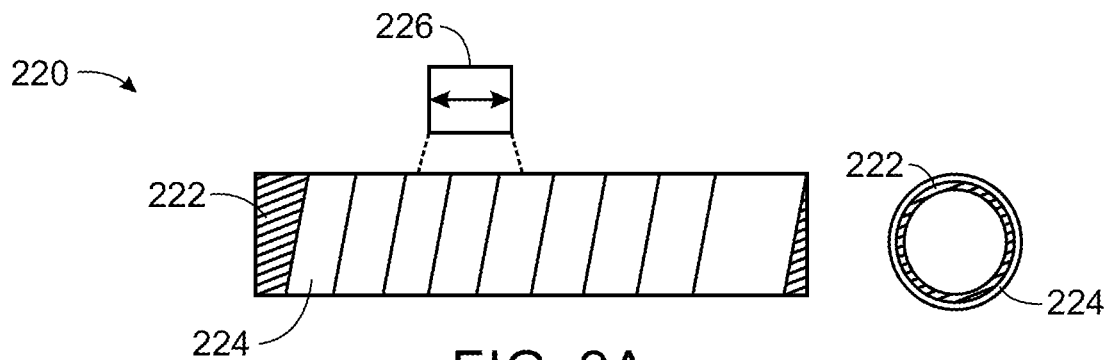
FIGS. 2A-2D shows a composite wrap repair system with a laser curing head.

FIG. 2A depicts a composite wrap repair system containing a metal pipe 222, a first layer of the composite wrap and wet-out resin 224 and a laser curing head 226. The first layer of the composite wrap and wet-out resin 224 is disposed on the metal pipe 222. The laser curing head 226, containing the diode laser, is scanned to partially cure the wet-out resin of the first layer 224. The metal pipe 224 can be used to transport a hydrocarbon, water, oil, gas, and/or liquid nitrogen.

Figure 2B:
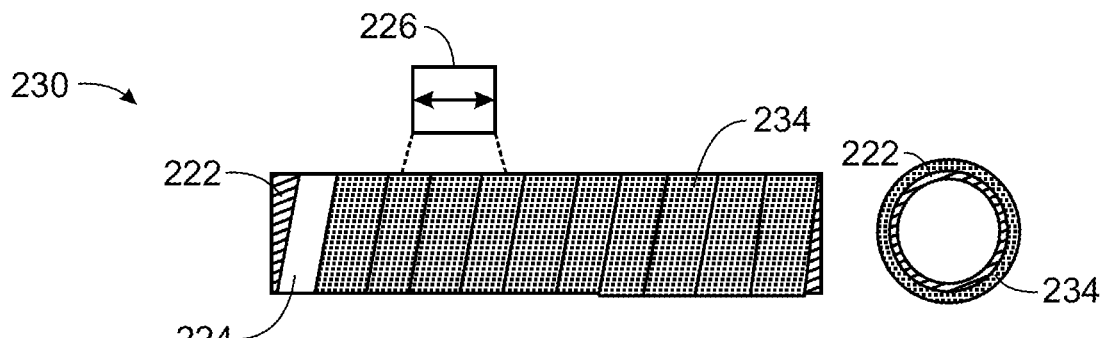

FIG. 2B depicts the composite wrap repair system 230 that includes the components of the composite wrap repair system 220 of FIG. 2A after a second layer of composite wrap and wet-out resin 234 is disposed on the first layer of the composite wrap and wet-out resin 224. The laser curing head 226 is scanned to partially cure the wet-out resin of the second layer 234.

Figure 2C:
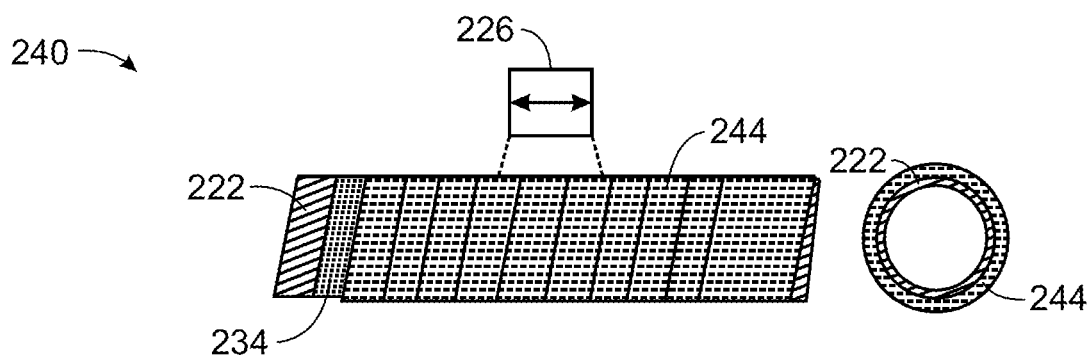

FIG. 2C depicts the composite wrap repair system 240 that includes the components of the composite wrap repair system 230 of FIG. 2B after a third layer of composite wrap and wet-out resin 244 is disposed on the second layer of the composite wrap and wet-out resin 234. The laser curing head 226 is scanned to partially cure the wet-out resin of the third layer 244.

Figure 2D:
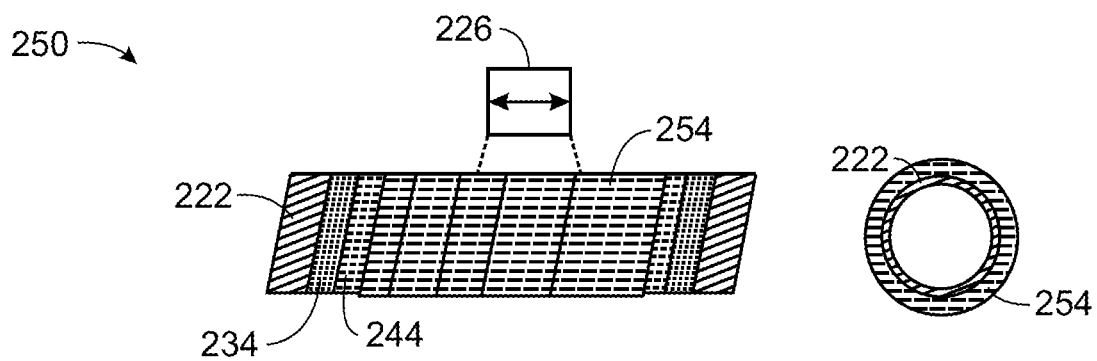

FIG. 2D depicts the composite wrap repair system 250 that includes the components of the composite wrap repair system 240 of FIG. 2C after an ith layer of composite wrap and wet-out resin 254 is disposed on the previous layers of the composite wrap and wet-out resin. The laser curing head 226 containing the diode laser is scanned to partially cure the wet-out resin of the ith layer 254.

In some embodiments, the laser curing head has a scan speed of about 1000 mm/min to about 5000 mm/min, such as about 1000 mm/min to about 2000 mm/min, about 1000 mm/min to about 3000 mm/min, about 1000 mm/min to about 4000 mm/min, about 2000 mm/min to about 3000 mm/min, about 2000 mm/min to about 4000 mm/min, about 2000 mm/min to about 5000 mm/min, about 3000 mm/min to about 4000 mm/min, about 3000 mm/min to about 5000 mm/min, about 4000 mm/min to about 5000 mm/min, about 1000 mm/min, about 2000 mm/min, about 3000 mm/min, about 4000 mm/min, or about 5000 mm/min.

In some embodiments, about 1 to about 50 composite wrap layers are disposed on the metal pipe, such as about 1 to about 5 composite wrap layers, about 1 to about 10 composite wrap layers, about 1 to about 20 composite wrap layers, about 1 to about 30 composite wrap layers, about 1 to about 40 composite wrap layers, about 5 to about 10 composite wrap layers, about 5 to about 20 composite wrap layers, about 5 to about 30 composite wrap layers, about 5 to about 40 composite wrap layers, about 5 to about 50 composite wrap layers, about 10 to about 20 composite wrap layers, about 10 to about 30 composite wrap layers, about 10 to about 40 composite wrap layers, about 10 to about 50 composite wrap layers, about 20 to about 30 composite wrap layers, about 20 to about 40 composite wrap layers, about 20 to about 50 composite wrap layers, about 30 to about composite wrap layers, about 30 to about 50 composite wrap layers, about 40 to about 50 composite wrap layers, about 1 composite wrap layer, about 5 composite wrap layers, about 10 composite wrap layers, about 20 composite wrap layers, about 30 composite wrap layers, about 40 composite wrap layers, or about 50 composite wrap layers, are disposed on the metal pipe.

Methods of Using Composite Wrap Repair with Diode Laser Curing

Thus, the disclosure provides a method of repairing a defect in a metal pipe, the method including applying a layer of a composite wrap on the defect section, disposing a layer of a wet-out resin on the composite wrap, and at least partially curing the layer of wet-out resin with a diode laser. In some embodiments, a temperature generated by the diode laser is about 50° C. to about 450° C. In some embodiments, the wavelength of the diode laser is about the same wavelength as an absorption maximum of the wet-out resin. In some embodiments, the diode laser has a wavelength of about 600 nm to about 4000 nm. In some embodiments, the diode laser has a power of about 200 W to about 1000 W. In some embodiments, the diode laser has a scan speed of about 1000 mm/min to about 5000 mm/min. In some embodiments, the steps of applying a layer of a composite wrap on the defect section being repaired, disposing a layer of a wet-out resin on the composite wrap, and at least partially curing the layer of wet-out resin with a diode laser are repeated until 1 to 50 layers of wet-out resin are disposed. In some embodiments, after the layers of wet-out resin are disposed, the layers of wet-out resin are fully cured using the diode laser at a second intensity. In some embodiments, a temperature generated by the diode laser at the second intensity is about 100° C. to about 250° C. In some embodiments, at the second intensity, the diode laser has a power of about 200 W to about 600 W. In some embodiments, prior to applying the layer of a composite wrap on the adhesive primer, the defect section is leveled by disposing a filler material, and an adhesive primer is disposed onto the defect section. In some embodiments, the diode laser at least partially cures the adhesive primer. In some embodiments, prior to leveling the defect by disposing the filler material, contaminants are removed from a surface of the metal pipe. In some embodiments, the composite wrap contains a non-metal fabric material. In some embodiments, the composite wrap contains carbon fibers, glass fibers, and/or aramid fibers. In some embodiments, the composite wrap contains woven fiberglass. In some embodiments, the wet-out resin contains an epoxy, a polyurethane and/or a vinyl ester. In some embodiments, the adhesive primer contains an epoxy, a polyurethane and/or a vinyl ester. In some embodiments, the adhesive primer contains an epoxy. In some embodiments, contaminants are removed from the surface by abrasive blasting and/or sanding. In some embodiments, the metal pipe is a hydrocarbon transportation pipeline. In some embodiments, the pipeline is used to transport a hydrocarbon, water, oil, gas and/or liquid nitrogen.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

For example, while embodiments have been described in which the adhesive primer is cured by the diode laser, the disclosure is not limited to such embodiments. In some embodiments, the adhesive primer is left to cure to a semi-rigid state at room temperature.

What is claimed is:

1. A method of repairing a defect section in a metal pipe, comprising:
   a) applying a layer of a composite wrap on the defect section;
   b) disposing a layer of wet-out resin on the composite wrap; and
   c) partially curing the layer of wet-out resin using a diode laser operating at a first intensity without completely curing the layer,
   wherein:
   i) steps a) to c) are repeated until 5 to 50 layers of wet-out resin are disposed; and
   ii) after i) fully curing all layers of the wet-out resin using the diode laser at a second intensity; and
   a temperature generated by the diode laser during step ii) is lower than a temperature generated by the diode laser during step c).

2. The method of claim 1, wherein the temperature generated by the diode laser during step c) is about 50° C. to about 450° C.

3. The method of claim 1, wherein, when using the diode laser at both the first and second intensities, a wavelength of the diode laser is about the same wavelength as an absorption maximum of the wet-out resin.

4. The method of claim 1, wherein, when operating the diode laser at both the first and second intensities, the diode laser has a wavelength of about 600 nm to about 4000 nm.

5. The method of claim 1, wherein the diode laser has a power of about 200 W to about 1000 W when using the diode laser at the first intensity.

6. The method of claim 1, wherein the diode laser has a scan speed of about 1000 mm/min to about 5000 mm/min when using the diode laser at the first intensity.

7. The method of claim 1, wherein a temperature generated by the diode laser during step ii) is about 100° C. to about 250° C.

8. The method of claim 1, wherein at the second intensity, the diode laser has a power of about 200 W to about 600 W.

9. The method of claim 1, further comprising, prior to step a):
   leveling the defect section by disposing a filler material; and
   disposing an adhesive primer onto the defect section.

10. The method of claim 9, wherein the diode laser partially cures the adhesive primer.

11. The method of claim 9, further comprising, prior to leveling the defect section by disposing the filler material, removing contaminants from a surface of the metal pipe.

12. The method of claim 1, wherein the composite wrap comprises a non-metal fabric material.

13. The method of claim 12, wherein the composite wrap comprises at least one member selected from the group consisting of carbon fibers, glass fibers, and aramid fibers.

14. The method of claim 12, wherein the composite wrap comprises woven fiberglass.

15. The method of claim 9, wherein the wet-out resin comprises a member selected from the group consisting of an epoxy, a polyurethane and a vinyl ester.

16. The method of claim 9, wherein the adhesive primer comprises a member selected from the group consisting of an epoxy, a polyurethane and a vinyl ester.

17. The method of claim 1, wherein the metal pipe is a pipeline used to transport at least one member selected from the group consisting of a hydrocarbon, water, oil, gas, and liquid nitrogen.

18. The method of claim 2, wherein a temperature generated by the diode laser during step ii) is about 100° C. to about 250° C.

19. The method of claim 5, wherein at the second intensity, the diode laser has a power of about 200 W to about 600 W.

20. The method of claim 1, wherein:
   a temperature generated by the diode laser during step c) is about 50° C. to about 450° C.;
   the diode laser has a power of about 200 W to about 1000 W when using the diode laser at the first intensity;
   a temperature generated by the diode laser during step ii) is about 100° C. to about 250° C.; and
   at the second intensity, the diode laser has a power of about 200 W to about 600 W when using the diode laser at the second intensity.

* * * * *